United States Patent
Sarlin

(10) Patent No.: US 11,415,176 B2
(45) Date of Patent: Aug. 16, 2022

(54) INTERFACE FOR FASTENING A FIRST COMPONENT TO A SECOND COMPONENT COMPRISING A COLLAR MADE FROM COMPOSITE MATERIAL, BEARING UNIT COMPRISING SUCH AN INTERFACE AND METHOD FOR MANUFACTURING SUCH AN INTERFACE

(71) Applicant: SKF Aerospace France S.A.S, Montigny-le-Bretonneux (FR)

(72) Inventor: Rémi Sarlin, Allex (FR)

(73) Assignee: SKF Aerospace France S.A.S, Montigny-le-Bretonneux (FR)

(*) Notice: Subject to any disclaimer, the term of this patent is extended or adjusted under 35 U.S.C. 154(b) by 59 days.

(21) Appl. No.: 17/021,108

(22) Filed: Sep. 15, 2020

(65) Prior Publication Data
US 2021/0131496 A1  May 6, 2021

(30) Foreign Application Priority Data
Nov. 4, 2019 (FR) ...................................... 1912351

(51) Int. Cl.
| | |
|---|---|
| *F16C 35/02* | (2006.01) |
| *F16C 17/02* | (2006.01) |
| *B29C 45/14* | (2006.01) |
| *F16B 5/02* | (2006.01) |
| *F16B 37/04* | (2006.01) |

(Continued)

(52) U.S. Cl.
CPC .......... *F16C 35/02* (2013.01); *B29C 37/0078* (2013.01); *B29C 45/14* (2013.01); *B29C 45/14311* (2013.01); *F16B 5/02* (2013.01); *F16B 37/048* (2013.01); *F16C 17/02* (2013.01); *F16B 37/12* (2013.01)

(58) Field of Classification Search
CPC ...... F16C 33/042; F16C 33/045; F16C 33/06; F16C 33/077; F16C 2220/06; F16C 2226/60; B29C 37/0078; B29C 45/14; B29C 45/14311; F16B 5/02; F16B 37/048; F16B 37/12
See application file for complete search history.

(56) References Cited

U.S. PATENT DOCUMENTS

| | | | |
|---|---|---|---|
| 4,580,757 A * | 4/1986 | Dobhan | ................ F16C 13/006 425/117 |
| 5,079,055 A | 1/1992 | Doyle | |

(Continued)

FOREIGN PATENT DOCUMENTS

| | | |
|---|---|---|
| DE | 10 2008 007168 A1 | 8/2009 |
| EP | 1 060 812 A2 | 12/2000 |
| EP | 2 740 955 A1 | 6/2014 |

(Continued)

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

Interface for fastening a first component to a second component providing a fastening collar made from composite material intended to be overmoulded at least on a part of the first component and including a bearing surface intended to bear on the second component and a fastening insert extending along an axis of elongation substantially perpendicular to the bearing surface of the collar for fastening to the second component, the fastening collar being overmoulded around the insert.

6 Claims, 9 Drawing Sheets

(51) Int. Cl.
*B29C 37/00* (2006.01)
*F16B 37/12* (2006.01)

(56) References Cited

U.S. PATENT DOCUMENTS

2015/0156954 A1* 6/2015 Ciulla .................. F16C 19/184
384/460
2018/0045248 A1* 2/2018 Falaschi ................ F16C 35/045

FOREIGN PATENT DOCUMENTS

| EP | 2 829 754 A1 | 1/2015 |
| EP | 2 865 538 A1 | 4/2015 |
| FR | 2 800 815 A1 | 5/2001 |
| FR | 3 019 604 A1 | 10/2015 |

* cited by examiner

[Fig 1]
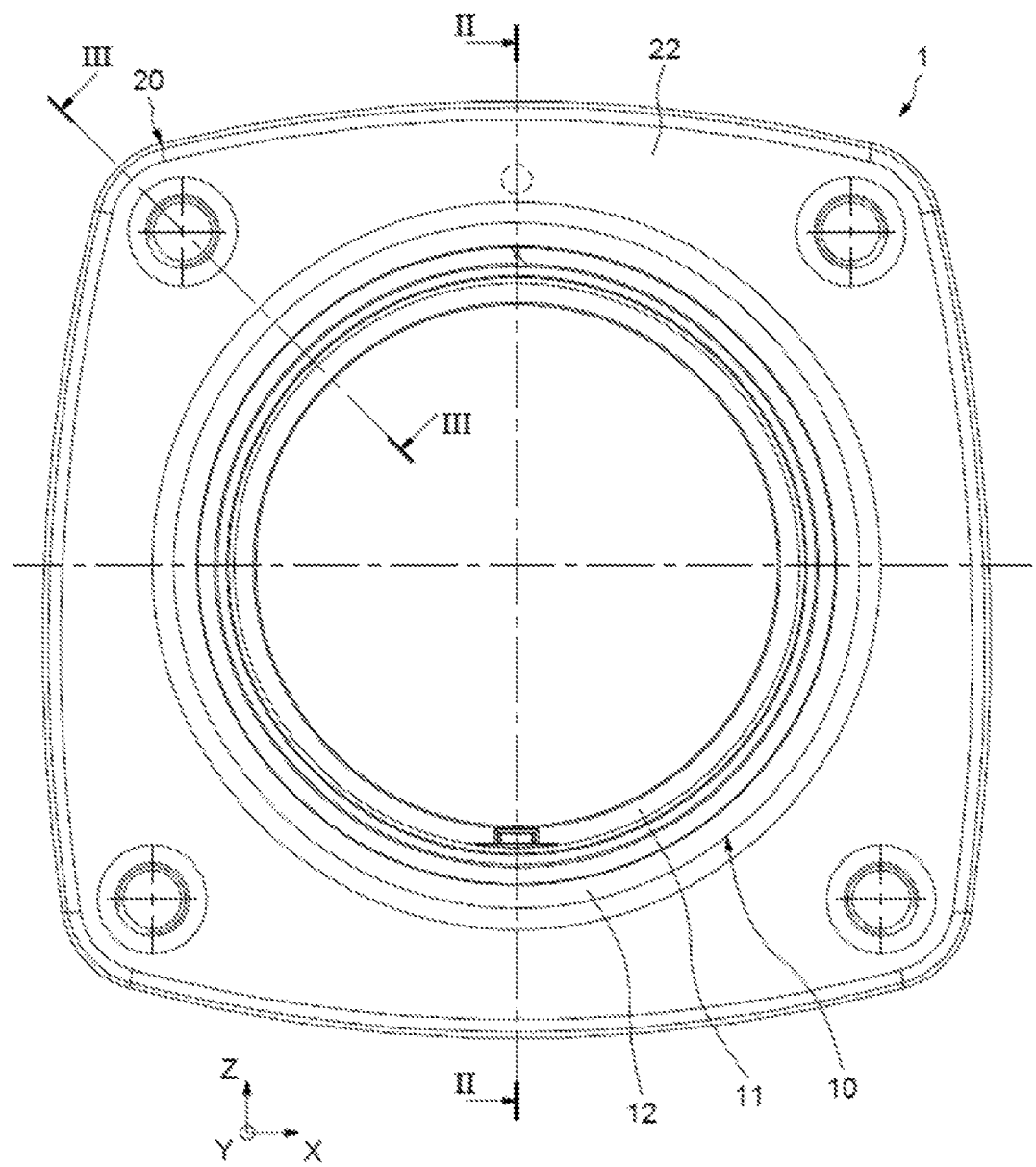

[Fig 2]
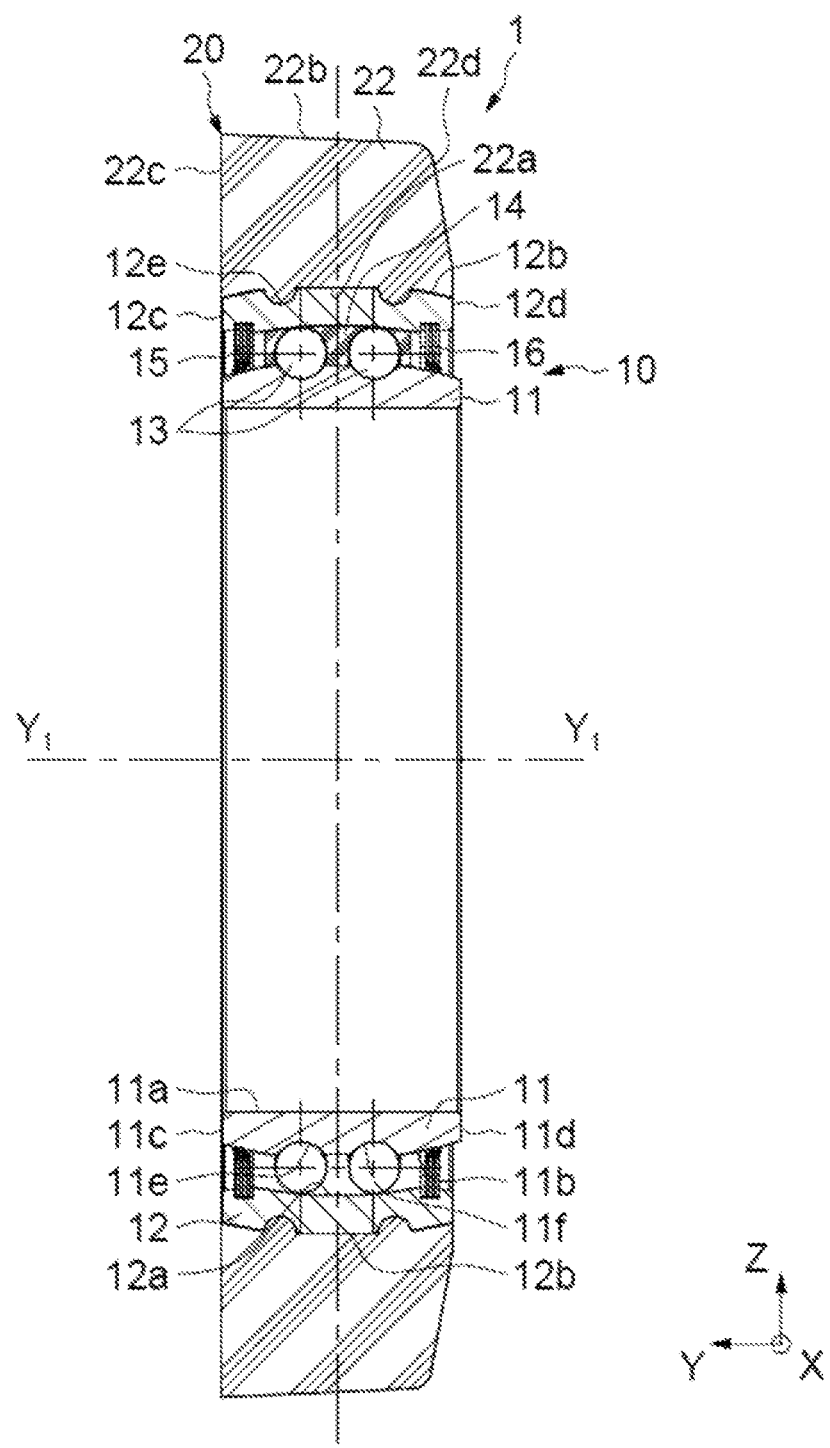

[Fig 3]
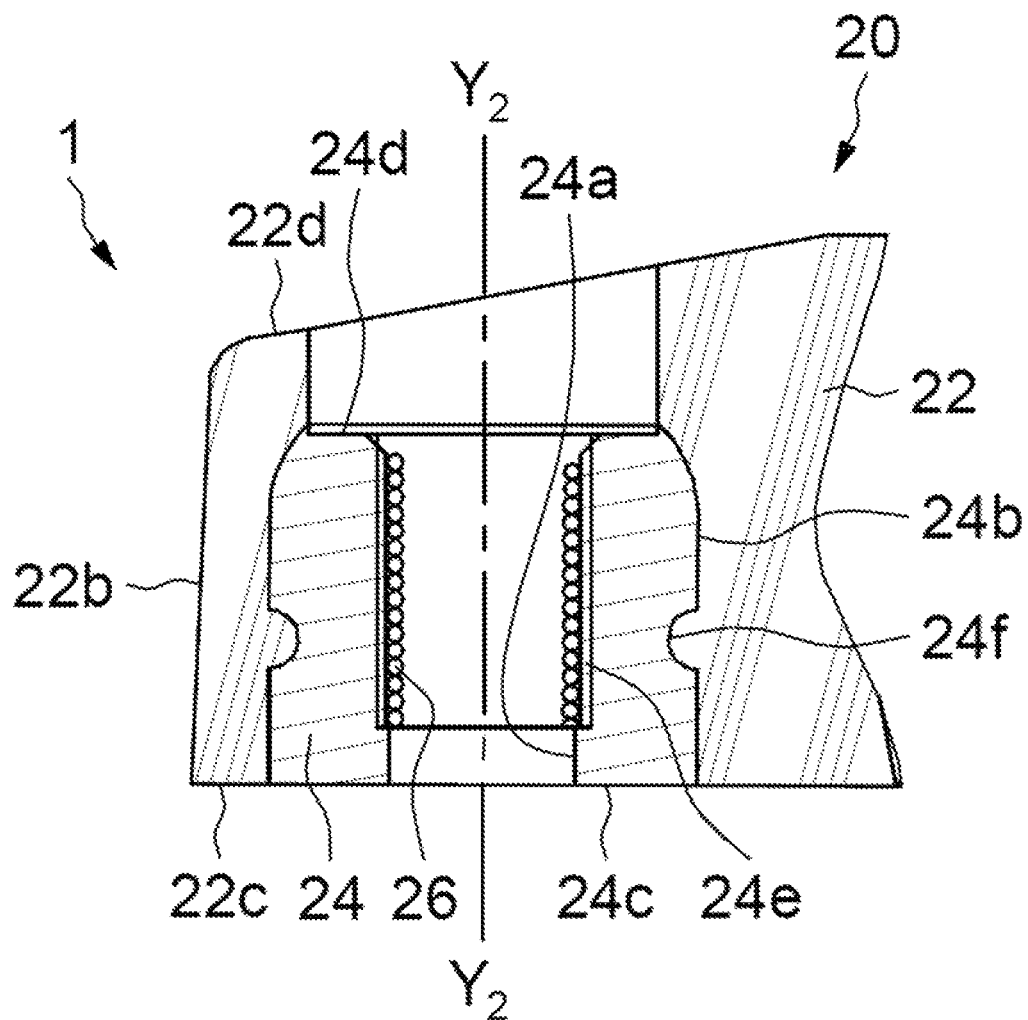

[Fig 4]
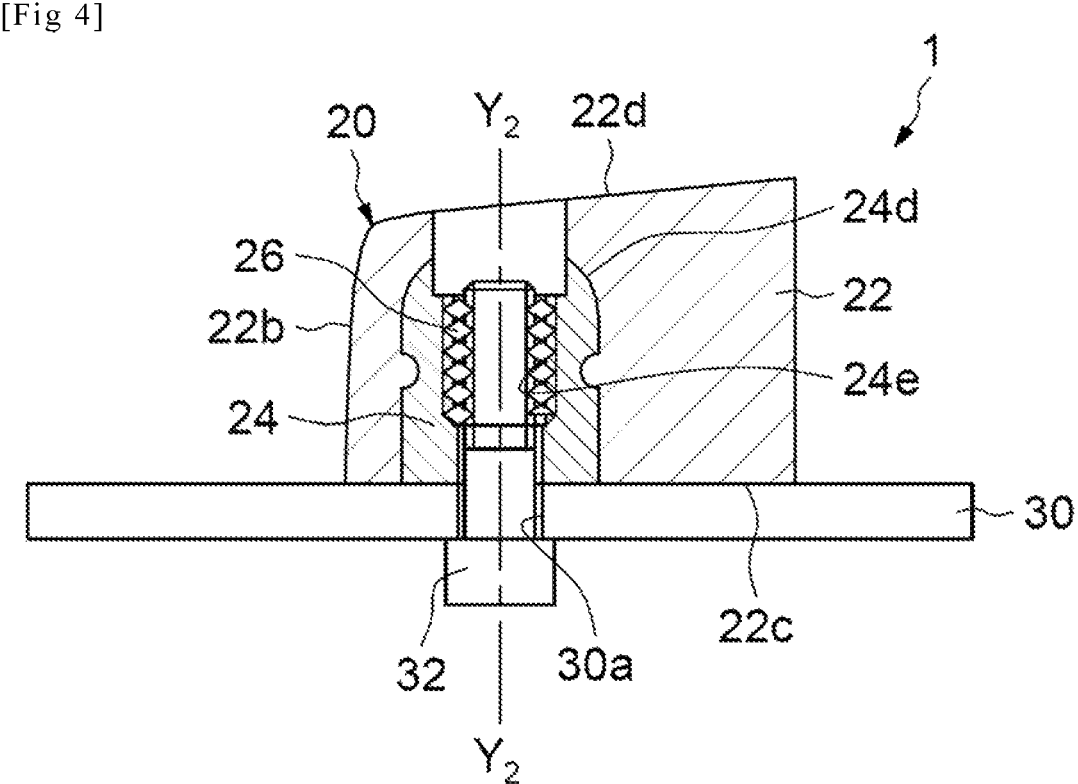

[Fig 5]
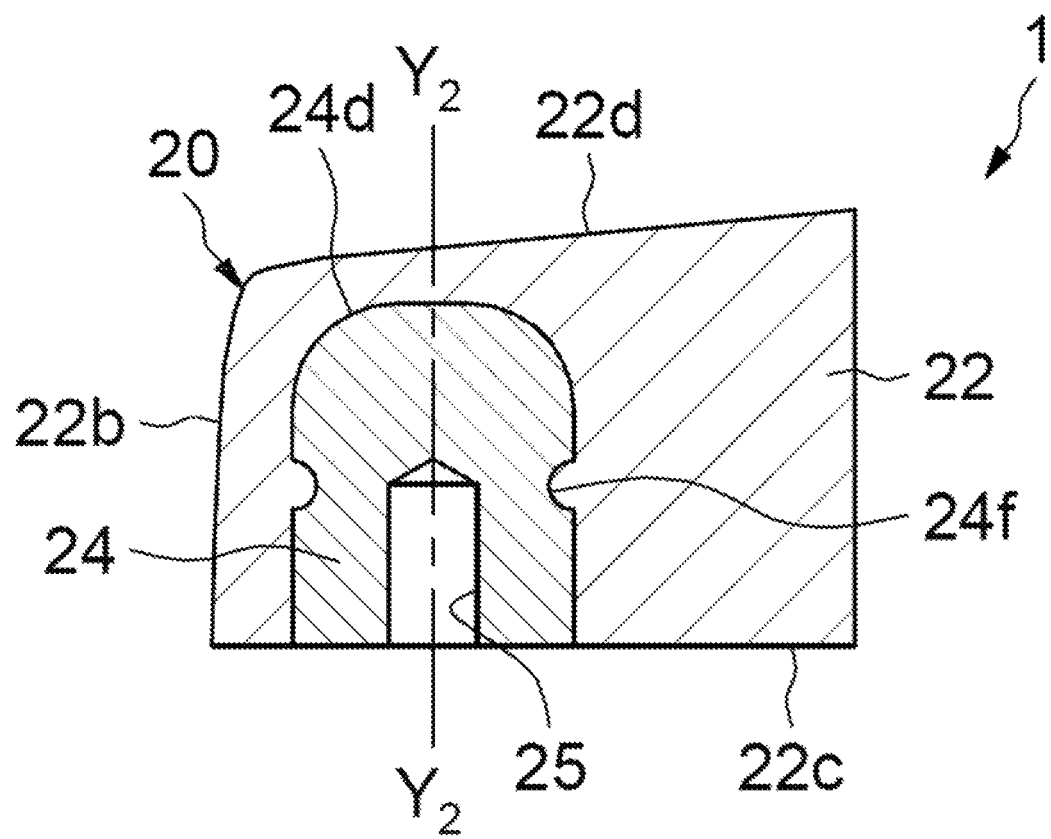

[Fig 6]
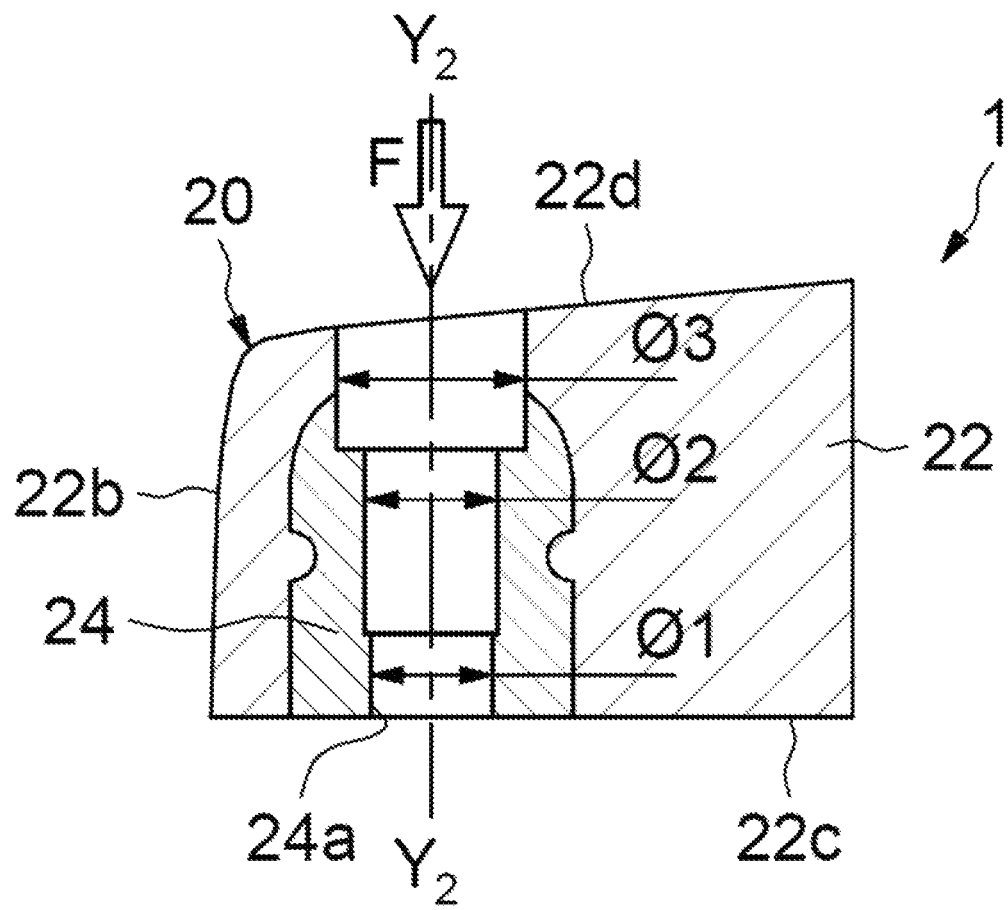

[Fig 7]
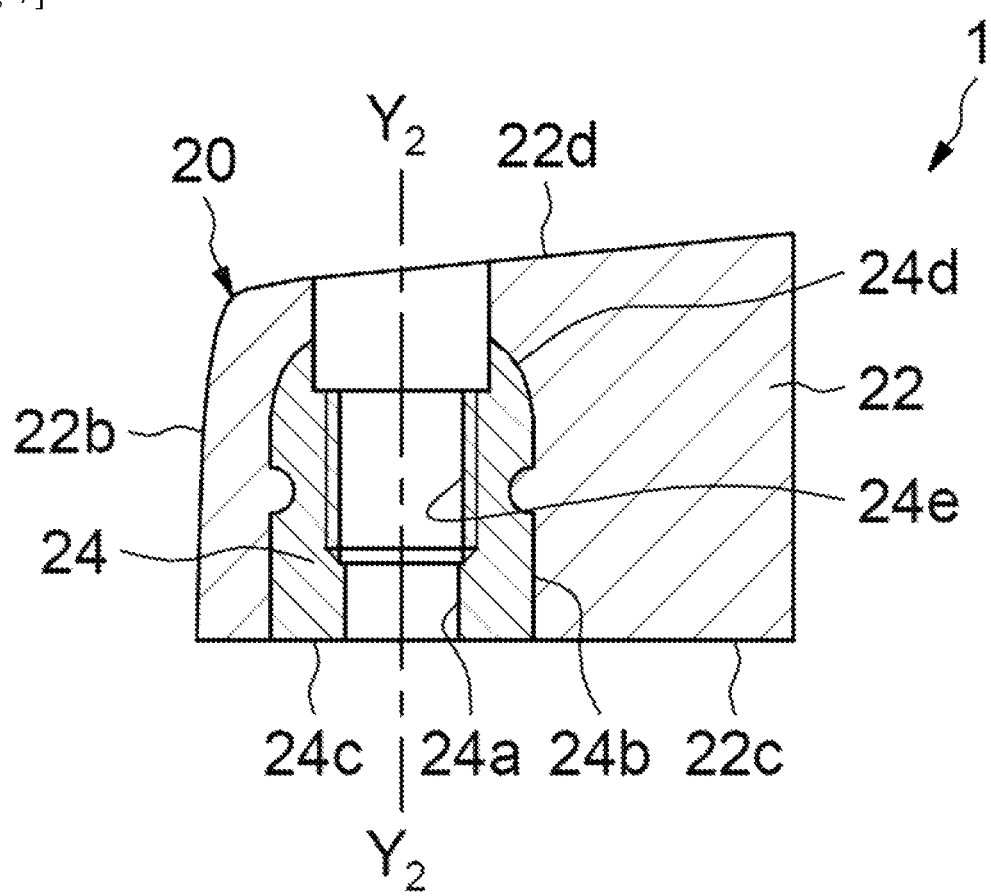

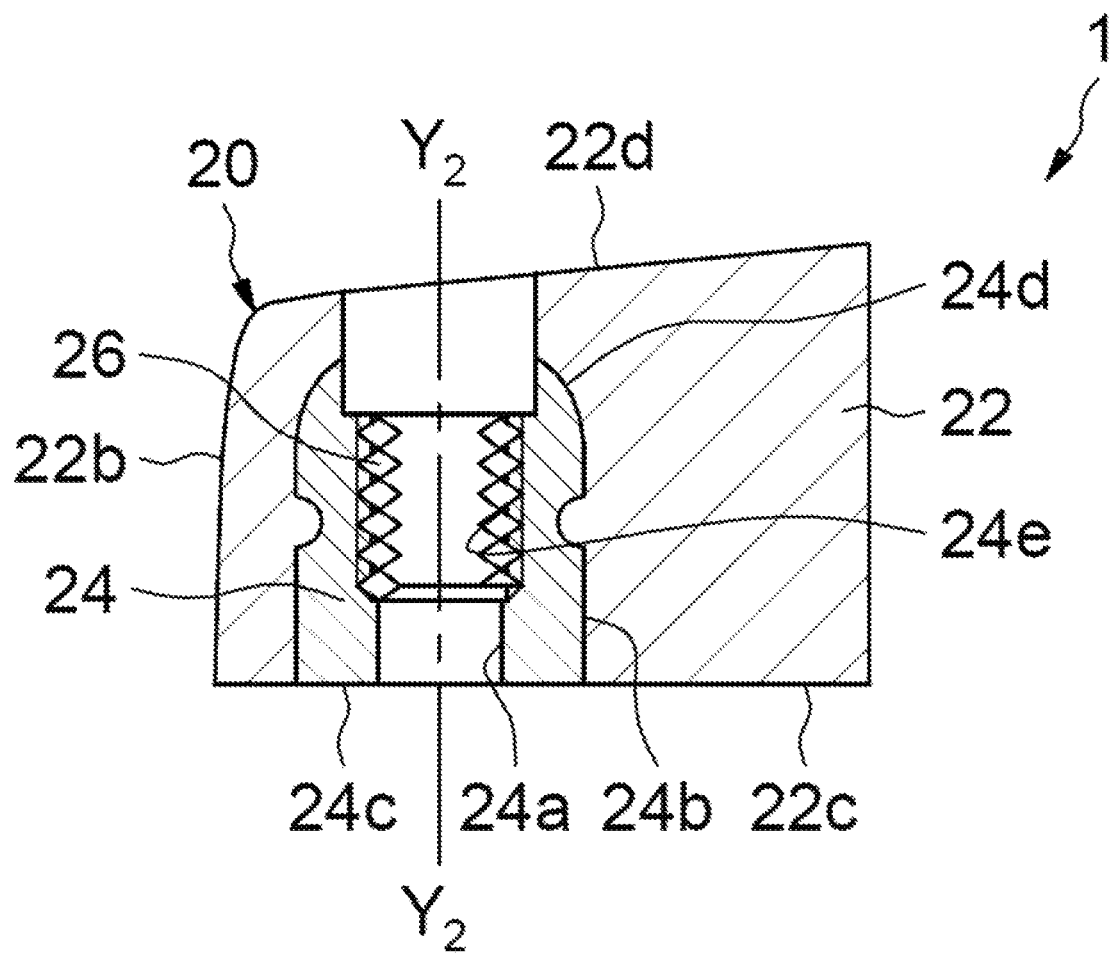
[Fig 8]

[Fig 9]
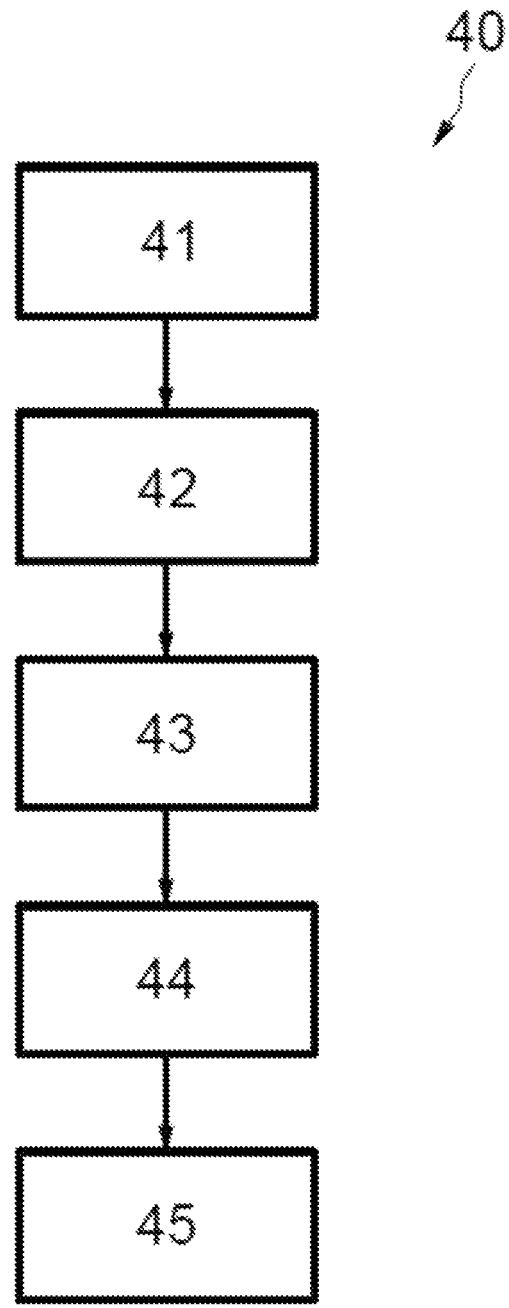

INTERFACE FOR FASTENING A FIRST COMPONENT TO A SECOND COMPONENT COMPRISING A COLLAR MADE FROM COMPOSITE MATERIAL, BEARING UNIT COMPRISING SUCH AN INTERFACE AND METHOD FOR MANUFACTURING SUCH AN INTERFACE

CROSS-REFERENCE TO RELATED APPLICATIONS

This application claims priority to French Patent Application no. 1912351, filed Nov. 4, 2019, the contents of which is fully incorporated herein by reference.

TECHNICAL FIELD OF THE INVENTION

The present invention relates to the general field of fastening and centring a first component at least partly made from composite material with respect to a second component. More particularly, the present invention relates to rolling bearings referred to as "flanged rolling bearing units", in particular for an aircraft.

BACKGROUND OF THE INVENTION

A flanged rolling bearing unit is understood to be a rolling bearing that is ready to be mounted, greased and sealed. Such a rolling bearing is configured to compensate for errors in alignment between the shaft and the bearing. In general, a flanged rolling bearing comprises an inner ring, an outer ring and a plurality of rolling elements, such as balls, disposed between raceways made on the rings. The outer ring comprises a fastening collar, known as a "flange", extending radially from a lateral flank of the outer ring for fastening to a component.

In order to fasten such a rolling-element bearing to the component, use is generally made of floating nuts crimped onto the fastening collar of the outer ring of the rolling bearing, into which screws are screwed. A nut is referred to as a "floating" nut when it comprises an outer envelope crimped into a drilled opening made in a first component to be fastened and an inner nut configured to move radially inside the envelope, without rotational movement. Such a floating nut makes it possible to compensate for errors in alignment, manufacturing tolerances, etc. Thus, when a screw is screwed into a floating nut, the screwing force produces a permanent deformation of the nut, thus preventing loosening of the screw.

However, such rolling bearings are made from metallic material, such as steel or cast iron for example, and are therefore particularly heavy.

The present invention aims to remedy these drawbacks.

SUMMARY OF THE INVENTION

More generally, the present invention aims to propose a lightweight system for fastening a first fastening component to a second fastening component.

A subject of the invention is an interface for fastening a first component to a second component comprising a fastening collar made from composite material intended to be overmoulded at least on a part of the first component and comprising a bearing surface intended to bear on the second component. The interface also comprises a fastening insert extending along an axis of elongation substantially perpendicular to the bearing surface of the collar for fastening, for example by screwing, to the second component, the fastening collar being overmoulded around the insert.

"Substantially perpendicular to the bearing surface" is understood to mean extending along an axis inclined relative to the bearing surface at an angle of between 80° and 110°.

The collar is made from composite material comprising, for example, a glass-fibre reinforced polyamide material. Thus, the weight of such a collar is particularly low. The reduction in weight allows fuel to be saved during the use of such a fastening interface for a rolling bearing in a vehicle, such as a motor vehicle or an aircraft.

The fastening interface allows satisfactory centring of the first component on the second component, and robust fastening of the components.

Advantageously, the insert is made from metallic material, for example steel.

For example, the insert is substantially cylindrical. "Substantially cylindrical" is understood to mean a volume shape with a circular, oval or polygonal section, or any other shape. A polygonal shape allows the insert to avoid turning during drilling.

Advantageously, the insert comprises a tapped portion which extends along the axis of elongation and into which is screwed a helical elastic member of the interface, which member is intended to cooperate with a fastener, such as a fastening screw for example.

The elastic member is configured to withstand significant radial deformation during mechanical loading and to return to its original shape when the mechanical loading is stopped.

The helical elastic member ensures the screw anti-rotation function.

The helical elastic member is, for example, a helical thread insert.

A "helical thread insert", known as a "helicoil", is understood to be a coil spring screwed into the tapped portion of the insert. The use of such a thread insert in place of tapping the entire insert makes it possible to avoid an operation of drilling the collar from the bearing-surface side, and thus to provide only a single drilling operation.

The outer surface of the insert comprises at least one annular groove for fastening the fastening collar of the fastening interface by moulding.

The fastening collar is, for example, delimited radially by an inner cylindrical surface and an outer cylindrical surface. For example, the inner cylindrical surface extends axially beyond the outer cylindrical surface.

The fastening collar may also be delimited axially by the bearing surface and by an opposite second frontal surface.

The metallic insert is, for example, delimited radially by an inner surface and an outer surface and axially by a first frontal radial surface axially aligned with the first frontal surface of the collar and by a second frontal radial surface housed inside the collar.

According to a second aspect, the invention relates to a bearing unit item comprising a bearing having at least one inner ring and one outer ring. The bearing unit item also comprises a fastening interface as described above. The collar of the interface is overmoulded on at least one of the rings, preferably around the outer ring.

A "bearing unit item" is understood to be a bearing unit that is ready to be mounted, greased and sealed.

For example, the bearing is a rolling bearing comprising at least one row of rolling elements disposed between the rings. Alternatively, the rolling bearing may be a plain bearing.

The bearing surface of the collar is for example axially aligned with first frontal surfaces of the rings of the bearing, when the first component is a bearing.

For example, the inner ring of the bearing extends axially beyond the outer ring, on the side opposite the bearing surface of the fastening collar.

Advantageously, the outer ring comprises at least one annular channel for fastening the fastening collar of the fastening interface by moulding.

Such rolling bearings are lightweight and appropriate for applications at high speeds with moderate loads and minimal maintenance. In addition, such rolling bearings are resistant to various chemical products and dilute acids According to a third aspect, the invention relates to a method for manufacturing an interface for fastening a first component to a second component comprising a step of moulding a composite material forming a fastening collar at least on an insert comprising a blind hole extending along an axis of elongation substantially perpendicular to a bearing surface of the collar and emerging onto the bearing surface.

When the first component is a bearing, the moulding step allows the fastening collar to be overmoulded around the outer ring. As an alternative, overmoulding the fastening collar in the bore of the inner ring of the bearing could be provided.

During this step, a part of the first component and the insert are mounted in a mould and a composite material is injected into the mould. Thus, the fastening collar made from composite material is formed around the insert and a part of the first component.

The manufacturing method comprises a step of demoulding the collar.

Advantageously, the method also comprises the steps of:
drilling the collar and the insert along the axis of elongation from a second frontal surface opposite the bearing surface of the collar, the drilled opening emerging into the blind hole of the insert;
forming a tapped portion on at least a part of the drilled surface of the insert; and
putting a helical elastic member, such as a helical thread insert for example, in place in the tapped portion of the insert.

For example, the step of putting in place is realized with the aid of a pin on which the elastic member is mounted and which comes to be screwed into the tapped portion through the second frontal surface During the tapping operation, a tap or any tool configured to realize threads on the inner surface of the insert is for example used.

The drilling operation allows the insert to be drilled.

For example, during the drilling step, stepped drilling is carried out along the axis of elongation of the insert, the stepped drilling comprising at least two successive diameters decreasing from the second frontal surface towards the bearing surface.

For example, the stepped drilling comprises three successive decreasing diameters.

The tapped portion is preferably formed on the inner surface of the insert having the second inner diameter.

During the stepped drilling, drilling is first performed with a first drill bit having a first diameter, then with a second drill bit having a second diameter greater than the first diameter, and with a third drill bit having a third diameter greater than the second diameter. Thus, a single drilling operation is performed only from a single surface, namely the second frontal surface.

As a variant, the drilling operation may be realized with just a single stepped drill bit. This allows the time associated with drilling to be reduced.

A single drilling operation through the second frontal surface opposite the bearing surface allows the various coaxial diameters to be obtained.

The bearing surface of the collar is advantageously machined, for example by surfacing, so as to obtain good planarity before drilling is carried out.

According to another aspect, the invention relates to a method for manufacturing a bearing unit comprising a bearing having at least one inner ring and one outer ring and an interface for fastening the bearing to a second component. The method comprises prior steps of mounting the bearing, a step of moulding a composite material forming a fastening collar on at least one of the rings of the bearing and on an insert comprising a blind hole extending along an axis of elongation substantially perpendicular to a bearing surface of the collar and emerging onto the bearing surface.

The bearing surface of the collar is advantageously machined, for example by surfacing, so as to obtain good planarity before drilling is carried out.

During this step, a part of the bearing and the insert are mounted in a mould and a composite material is injected or compressed into the mould. Thus, the fastening collar made from composite material is overmoulded on the insert and on a part of the bearing.

The method for manufacturing the bearing unit also comprises the subsequent steps of the method for manufacturing the fastening interface as described above.

According to another aspect, the invention relates to a use of a rolling bearing as described above in an aircraft.

BRIEF DESCRIPTION OF THE FIGURES

The present invention will be better understood upon studying the detailed description of embodiments which are given by way of entirely nonlimiting example and are illustrated by the appended drawings, in which:

FIG. 1 is a front view of a flanged rolling bearing unit comprising a fastening interface according to one embodiment of the invention;

FIG. 2 is a view along the cross section II-II in FIG. 1;

FIG. 3 is a view along the cross section in FIG. 1;

FIG. 4 partially shows the fastening interface in FIG. 1 assembled on a second component;

FIGS. 5-8 illustrate the steps of manufacturing the fastening interface in FIG. 1; and FIG. 9 illustrates the steps of the manufacturing method of FIGS. 5 to 8.

DETAILED DESCRIPTION OF THE INVENTION

In the remainder of the description, an orthonormal basis X, Y, Z will be considered, with Z corresponding to an axis of elevation representing the vertical direction. The expressions "inner" and "outer" refer to the axis of rotation Y1-Y1 of the rolling bearing, the inner parts are closer to the axis of rotation than the outer parts.

FIG. 1 shows a rolling bearing, with the overall reference 10, comprising an inner ring 11, an outer ring 12 and two rows of rolling elements 13 disposed between the rings 11, 12.

As illustrated, the rolling elements 13 are balls. As a variant, other types of rolling elements could be provided, such as rollers for example. A single row of rolling elements could also be provided.

It will be noted that the rolling bearing 10 could as a variant be a plain bearing, without rolling elements.

As illustrated, the rolling elements 13 are held circumferentially inside a cage 14. The cage 14 may comprise a plurality of cells configured to house the rolling elements and ensure they are held with a regular circumferential spacing.

Seals 15, 16 are provided radially between the rings 11, 12 on each side of the rolling elements 13.

As illustrated, the inner ring 11 is solid and is delimited radially by an inner cylindrical surface 11a and an outer cylindrical surface 11b and axially by two opposite frontal radial surfaces 11c, 11d.

The inner ring 11 has, on its outer cylindrical surface 11b, two toroidal channels 11e, 11f forming raceways for the rolling elements 13. The inner ring 11 may be manufactured by turning or forming a steel blank, the blank then being ground and optionally lapped at the raceway so as to provide the inner ring 11 with its geometric characteristics and its final surface finish.

As illustrated, the outer ring 12 is solid and is delimited radially by an inner cylindrical surface 12a and an outer cylindrical surface 12b and axially by two opposite frontal radial surfaces 12c, 12d.

The inner cylindrical surface 12a of the outer ring 12 forms a rolling surface for the rolling elements 13. As a variant, two toroidal channels forming raceways for the rolling elements 13 could be provided on the inner cylindrical surface 12a of the outer ring 12. The outer ring 12 may be manufactured by turning or forming a steel blank, the blank then being ground and optionally lapped at the raceway so as to provide the outer ring 12 with its geometric characteristics and its final surface finish.

As is visible in FIG. 2, the inner ring 11 has an axial dimension greater than the axial dimension of the outer ring 12, such that the first frontal radial surface 12c of the outer ring 12 is axially aligned on the first frontal radial surface 11c of the inner ring 11 and that the second frontal radial surface 11d of the inner ring 11 extends axially beyond the second frontal radial surface 12d of the outer ring 12. As a variant, it could be provided that the inner ring 11 has an axial dimension substantially equal to the axial dimension of the outer ring 12.

As illustrated, the outer surface 12b of the outer ring 12 comprises two annular channels 12e, 12f for fastening a fastening collar 22 of a system or interface 20 for fastening the rolling bearing 10 to a second component 30 by moulding, as is visible in FIG. 4.

As a variant, only a single annular channel, or a number of annular channels greater than two, for example equal to three, could be provided.

The fastening collar 22 is delimited radially by an inner cylindrical surface 22a and an outer cylindrical surface 22b. The inner cylindrical surface 22a extends axially beyond the outer cylindrical surface 22b.

The fastening collar 22 is moreover delimited axially by a first frontal radial surface 22c axially aligned with the first frontal surfaces 11c, 12c of the rings 11, 12 and by an opposite second frontal surface 12d.

As illustrated, the second frontal surface 12d comprises a substantially planar radial part (not referenced), axially aligned with the second frontal surface 12d of the outer ring 12 and a substantially inclined second part (not referenced), extending from the radial part towards the outer cylindrical surface 22b of the collar 22. As a variant, it could be provided that the inner surface 22a has an axial dimension substantially equal to the axial dimension of the outer surface 22b, and that the second frontal surface is substantially planar.

The collar 22 is made from composite material comprising, for example, a glass-fibre reinforced polyamide material. Thus, the weight of such a collar is particularly low.

The collar 22 is overmoulded around the outer ring 12. As a variant, it could be provided that the fastening collar is overmoulded in the bore of the inner ring 11.

The fastening system or fastening interface 20 also comprises a metallic insert 24 housed in the collar 22. During the operation of moulding the collar 22, the latter is also overmoulded on the metallic insert 24.

As illustrated in detail in FIG. 3, the metallic insert 24 is substantially cylindrical and extends along an axis of elongation Y2-Y2 parallel to the axis of rotation Y1-Y1 of the rolling bearing. The axis of elongation Y2-Y2 is perpendicular to the first frontal surface 22c or bearing surface of the collar 22. The axis of elongation Y2-Y2 is in this case a screwing axis.

The metallic insert 24 is delimited radially by an inner surface 24a and an outer surface 24b and axially by a first frontal radial surface 24c axially aligned with the first frontal surface 22c of the collar 22 and by an opposite second frontal radial surface 24d housed inside the collar 22.

The inner surface 24a of the metallic insert 24 comprises a tapped portion 24e into which a helical thread insert 26, known as a "helicoil", is screwed. A "helical thread insert" is understood to be a coil spring screwed into the tapped portion 24e of the insert 24. The use of such a thread insert 26 in place of tapping the entire insert 24 makes it possible to avoid an operation of drilling the collar from the side of the first frontal surface 22c, and thus to provide only a single drilling operation, which will be described below.

The outer surface 24b of the insert 24 comprises an annular groove 24f for fastening the fastening collar 22 of the fastening interface 20 by moulding.

The insert 24 is preferably made from steel.

The helical thread insert 26 could be generalized as an elastic member configured to withstand significant radial deformation during mechanical loading and to return to its original shape when the mechanical loading is stopped.

As illustrated in FIG. 4, the rolling bearing 10 is fastened via the fastening interface 20 to the second component 30. The first frontal radial surface 22c of the collar 22 is positioned so as to bear on the second component 30 and a screw 32 passes through a drilled opening 30a made in the second component 30, with a diameter greater than the diameter of the thread insert 26, and is screwed into the thread insert 26 of the metal insert 24.

The first frontal radial surface 22c of the collar forms the surface for bearing on the second component 30.

During screwing of the screw 32, the thread insert 26 is pushed radially outwards and in particular towards the inner surface 24a of the insert 24, such that the force exerted by the thread insert 26 on the screw 32 has the function of allowing anti-loosening of the screw 32.

The rolling bearing 10 and the fastening interface 20 form a bearing unit 1 that is ready to be mounted on the second component 30.

FIGS. 5 to 8 illustrate the successive steps of the manufacturing method 40 in FIG. 9.

The method 40 for manufacturing the interface 20 for fastening a first component 10, such as a rolling bearing for example, to a second component 30, comprises a first step 41 of moulding a composite material forming the fastening collar 22 on the first component 10 and in particular on the outer ring 12, and on the metallic insert 24. During this step 41, the outer ring 12 and the metallic insert 24 are mounted in a mould (not shown) and a composite material is injected or compressed into the mould. Thus, the fastening collar 22 made from composite material is formed around the insert 24 and the outer ring 12 of the rolling bearing. As a variant, in an exemplary embodiment in which the first component is not a rolling bearing, the collar 22 might be moulded on a part of the first component.

The manufacturing method 40 comprises a step 42 of demoulding the collar 22, visible in detail in FIG. 5. The metallic insert 24 comprises, in this step, a blind hole 25 with axis Y2-Y2 emerging onto the first frontal radial surface 22c.

During a third step 43, visible in detail in FIG. 6, drilling is carried out from the second frontal surface 22d opposite the first frontal bearing surface 22c in the direction F. As illustrated, stepped drilling is carried out along the axis Y2-Y2 of the metallic insert 24. The stepped drilling comprises three successive diameters $\phi 1$, $\phi 2$, $\phi 3$ decreasing from the second frontal surface 22d towards the first frontal surface 22c.

During the stepped drilling, drilling is first performed with a drill bit (not shown) having a diameter $\phi 1$, then with a second drill bit (not shown) having a diameter $\phi 2$ greater than the diameter $\phi 1$ of the first drill bit, and with a third drill bit (not shown) having a diameter $\phi 3$ greater than the diameter $\phi 2$ of the second drill bit. Thus, a single drilling operation is performed only from a single surface, namely the second frontal surface 22d of the collar 22. The drilling operation allows the insert 24 to be drilled. As a variant, the drilling operation may be realized with just a single stepped drill bit having the three diameters. This allows the time associated with drilling to be reduced.

During a fourth step 44, visible in detail in FIG. 7, tapping of the inner surface of the insert 24 having the second inner diameter $\phi 2$ is carried out. During the tapping, a tap (not shown) or any tool configured to realize threads on the inner surface of the insert 24 is for example used.

During a fifth step 45, visible in detail in FIG. 8, the helical thread insert 26 is inserted into the tapped portion 24e, for example with the aid of a pin on which the thread insert is mounted and which comes to be screwed into the tapped portion 24e through the second frontal surface 22d.

By virtue of the invention, there is thus obtained a fastening interface 20 comprising a fastening collar 22 made from composite material with centring of a first component on a second component, robust fastening of the components and an anti-loosening function by virtue of the helical thread insert.

The invention claimed is:

1. An interface for fastening a first component to a second component, comprises:
   a fastening collar made from composite material comprising a bearing surface, and
   a fastening insert extending along an axis of elongation substantially perpendicular to the bearing surface of the collar, the fastening collar being overmoulded around the insert, the fastening insert comprising:
      a metallic portion in direct contact with the fastening collar,
      a tapped portion that extends along the axis of elongation and is located on a radially inner surface of the metallic portion, and
      a helical elastic member which is screwed into the tapped portion of the metallic portion, wherein
      the helical elastic member rests on an axial end of a radially inward extending shoulder of the metallic portion.

2. The fastening interface according to claim 1, wherein the helical elastic member is a helical thread insert.

3. The fastening interface according to claim 1, wherein the outer surface of the insert comprises at least one annular groove for fastening the fastening collar by moulding.

4. A bearing unit comprising:
   a bearing having at least one inner ring and one outer ring, and
   a fastening interface for fastening the bearing to a second component, providing:
      a fastening collar made from composite material comprising a bearing surface, and
      a fastening insert extending along an axis of elongation substantially perpendicular to the bearing surface of the collar, the fastening collar being overmoulded around the insert, the fastening insert comprising:
         a metallic portion in direct contact with the fastening collar,
         a tapped portion that extends along the axis of elongation and is located on a radially inner surface of the metallic portion, and
         a helical elastic member which is screwed into the tapped portion of the metallic portion, wherein
         the helical elastic member rests on an axial end of a radially inward extending shoulder of the metallic portion, and wherein
      the collar of the interface is overmoulded on at least one of the rings.

5. The fastening interface according to claim 1, wherein the metallic portion is inserted into the fastening collar on an axial side opposite from where the helical elastic member is inserted into the fastening collar.

6. The bearing unit according to claim 4, wherein the metallic portion is inserted into the fastening collar on an axial side opposite from where the helical elastic member is inserted into the fastening collar.

* * * * *